No. 895,319. PATENTED AUG. 4, 1908.
E. WILLER.
COMBINATION TRUCK.
APPLICATION FILED JULY 12, 1906.
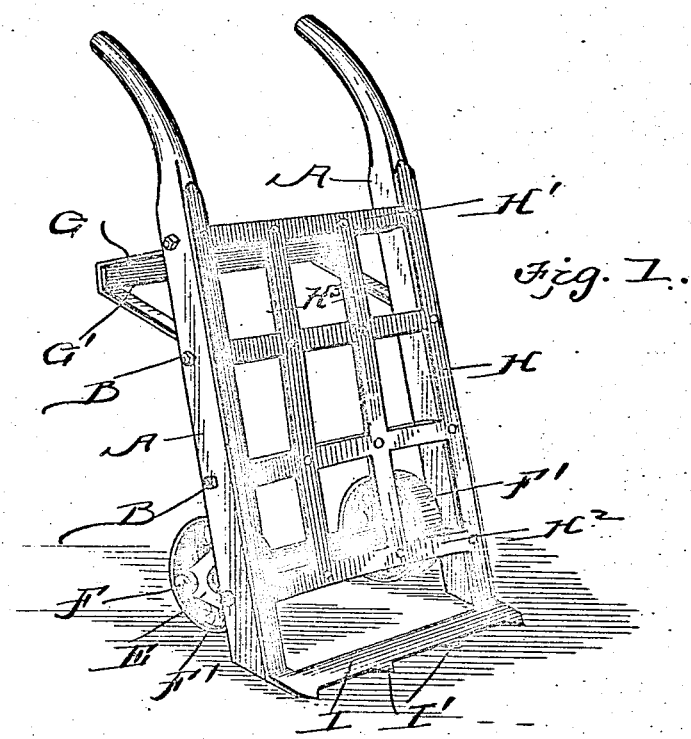
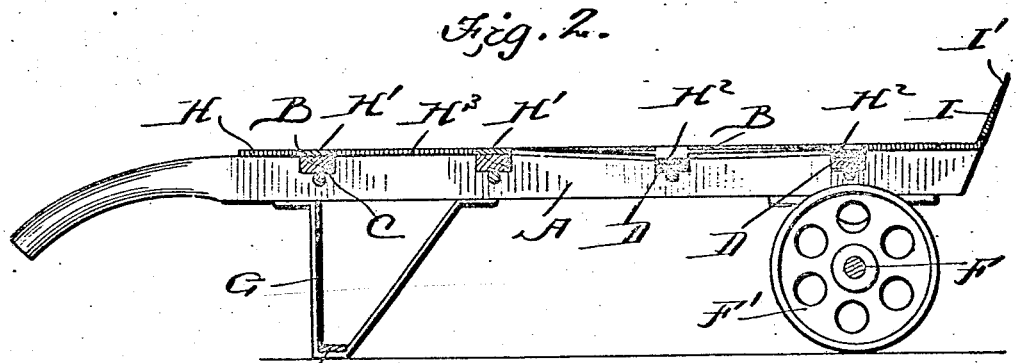
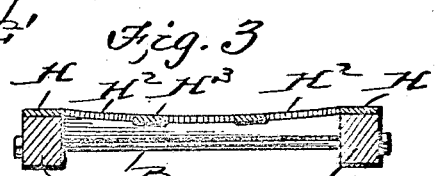
Witnesses
Inventor
E. Willer.

UNITED STATES PATENT OFFICE.

EDWARD WILLER, OF CAPE GIRARDEAU, MISSOURI.

COMBINATION-TRUCK.

No. 895,319.      Specification of Letters Patent.      Patented Aug. 4, 1908.

Application filed July 12, 1906. Serial No. 325,811.

*To all whom it may concern:*

Be it known that I, EDWARD WILLER, a citizen of the United States, residing at Cape Girardeau, in the county of Cape Girardeau and State of Missouri, have invented a new and useful Combination-Truck, of which the following is a specification.

This invention relates to trucks and more particularly to two wheel trucks, the object being to provide a truck so constructed that any size boxes or barrels can be readily handled, thereby overcoming the difficulties now existing with trucks in use.

This invention consists of the novel features of construction hereinafter fully described and pointed out in the claims.

In the drawings forming a part of this specification:—Figure 1 is a perspective view of my improved truck. Fig. 2 is a longitudinal sectional view of the same. Fig. 3 is a transverse section.

In the drawing A indicates the side bars having the usual handles at their upper ends and connected together by bolts B, and cross-bars C and D which rest on the bolts B. Apertured angle arms E are secured to the lower end of the side bars A in which is secured an axle F, having wheels F', mounted thereon adjacent each end between the side bars A. Angled supports G, are secured to the side bars adjacent the handles forming legs which are connected together by a bar G'.

A metal frame is secured on the truck consisting of side bars H, which are secured on the side bars A and cross-bars H', and H² which are secured on the cross bars C and D, the cross-bars H² being bent to fit the concaved face of the bars D. The bars H', H² are connected together by bars H³ forming a frame upon which small boxes can be readily carried. The lower end of the side bars H are bent upwardly and connected together by a toe plate I, which is provided with spurs I', so that it can be readily shoved under a barrel or box.

From the foregoing description it will be readily seen that I have provided a truck which is very simple and cheap in construction and one which is very effective in use as it can be used for the handling of barrels and boxes of all sizes.

Having thus fully described my invention, what I claim as new and desire to secure by Letters Patent, is:—

A truck comprising side bars connected together by spaced bolts having cross bars arranged on said bolts between said side bars, the lower two of said cross bars being provided with concaved upper faces and a metal frame arranged on the cross bars and side bars provided with concaved lower cross bars resting on the concaved cross bars of the truck and provided with a toe plate at its lower end having outwardly projecting spurs.

EDWARD WILLER.

Witnesses:
F. F. LINCOLN,
EMIL J. VALLEROY.